Oct. 25, 1960  E. I. VALYI  2,957,234
METHOD OF MAKING PRESSURE VESSEL
Filed March 12, 1957  2 Sheets-Sheet 1

INVENTOR
EMERY I. VALYI
BY
ATTORNEY

Oct. 25, 1960
E. I. VALYI
2,957,234
METHOD OF MAKING PRESSURE VESSEL
Filed March 12, 1957
2 Sheets-Sheet 2
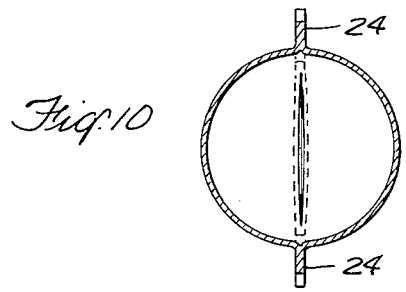
Fig. 10
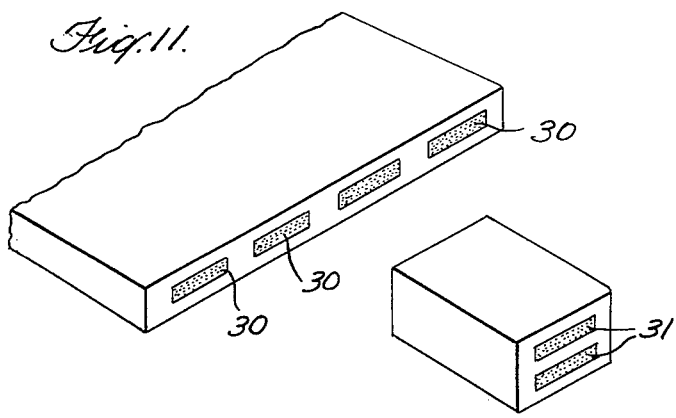
Fig. 11.
Fig. 12.
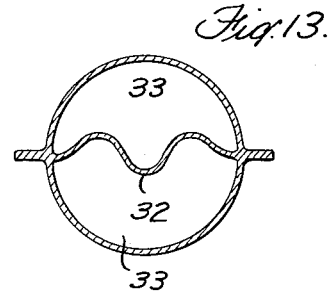
Fig. 13.
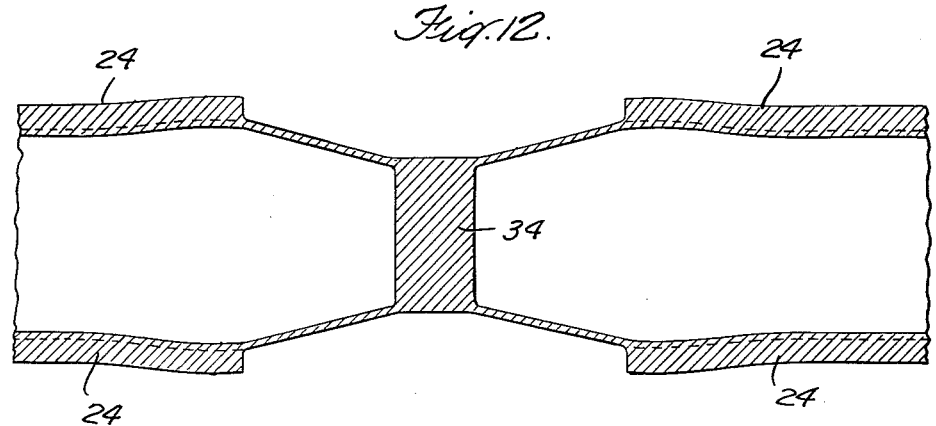
Fig. 14
INVENTOR
EMERY I. VALYI
BY C. H. Leek
ATTORNEY

United States Patent Office 2,957,234
Patented Oct. 25, 1960

2,957,234

METHOD OF MAKING PRESSURE VESSEL

Emery I. Valyi, New York, N.Y.
(ARD Corp., 20 S. Broadway, Yonkers, N.Y.)

Filed Mar. 12, 1957, Ser. No. 645,592

6 Claims. (Cl. 29—418)

This invention relates to a method of making seamless vessels and has for an object to provide a novel and improved method of the above type.

Another object is to provide a method of making closed end vessels having integral external fins or ribs.

Various other objects and advantages will be apparent as the nature of the invention is more fully disclosed.

Closed vessels, such as containers used for the transporting of liquids and gases, or as containers in the chemical industry, or as pressure vessels, are usually fabricated by extensive use of welding. This entails the use of highly skilled labor and extensive and complete inspection of all weld areas. In addition in many desirable alloys the characteristic of the parent metal is altered irreversibly in the entire heat affected area which results in undesirable physical properties.

A further object of this invention is to provide a novel and improved method of producing such a vessel wherein the necessity for welding and annealing the vessel is eliminated or at least substantially reduced.

In accordance with the invention a casting containing a refractory core is first made. The core is shaped to produce a chamber in the casting for the purpose to be described. The refractory core may be provided with one or more metal supports which position the core accurately in the mold and which are adapted to fuse into the metal of the casting in the casting step, or which are adapted to become integral with the metal of the casting during the subsequent rolling thereby constituting closures or partial closures for the core chamber in the casting.

After the casting is removed from the mold it is rolled with the core still in place, in one or more directions to form a flat sheet in which the core chamber is flattened to the form of a thin slit having a size and shape suited when inflated to produce the desired vessel. The initial stages of the rolling may be made with the casting hot and the final stages may take place with the sheet cold so as to impart the desired metallurgical characteristic to the rolled sheet. During this rolling the refractory core disintegrates and forms a coating to prevent welding of the opposite walls of the core chamber.

If the flattened chamber is closed at both ends a hole is drilled into the flattened chamber and fluid pressure is introduced to expand the walls to the shape of the desired vessel. The portion of the sheet beyond the flattened chamber may form fins or ribs extending along opposite side walls of the vessel and around or partly around the closed end or ends. These fins or ribs may serve as reinforcing elements or as supports or attaching means for other equipment. The fins or ribs may of course be removed or partly removed where not required on the finished vessel.

If in producing the casting the refractory core extends to a point beyond the mold cavity, the vessel will be closed at one end only and will be open at the other end. In this case expanding the plies after the rolling operation can be done by hydraulic or mechanical means, or a combination of both.

The steps in forming the vessel will be better understood from the following description, taken in connection with the accompanying drawings in which a specific embodiment has been set forth for purposes of illustration.

Figures 2, 4:
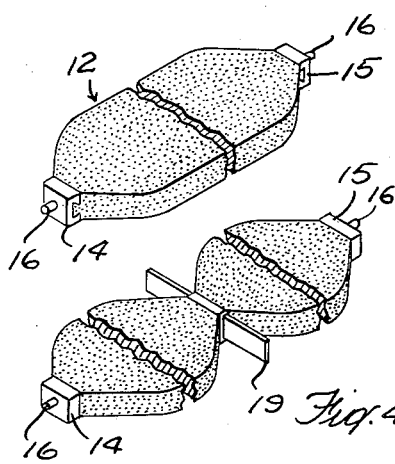
Fig. 2 is a detail view of the core used in the mold of Fig. 1.
Fig. 4 is a detail view of a similar core having an intermediate metal support.
Figure 8:
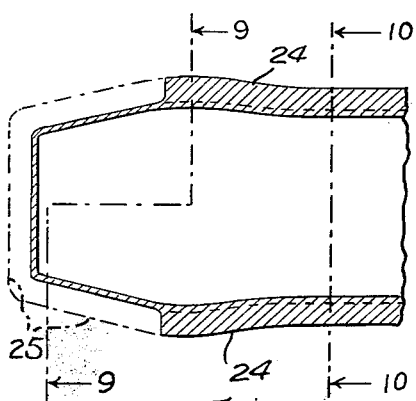
Fig. 8 is a longitudinal section of a vessel made from the rolled sheet of Fig. 7.
Figure 9:
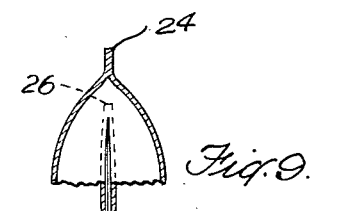

Figs. 9 and 10 are transverse sections through the vessel taken on the lines 9—9 and 10—10 respectively of Fig. 8;

Fig. 11 is a sectional view through a casting having a plurality of horizontally spaced core chambers therein;

Fig. 12 is a similar transverse section through a casting having a pair of vertically spaced core chambers therein;

Fig. 13 is a transverse section through a vessel having a longitudinal dividing wall produced from a casting like that of Fig. 12; and Fig. 14 is a partial longitudinal section showing a pair of axially aligned vessels as produced by the use of a core shaped as that of Fig. 4.

Figure 1:
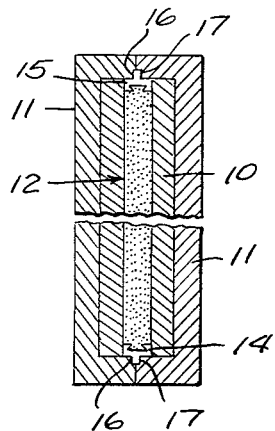
Fig. 1 is a transverse section through a mold showing a casting end core therein embodying the present invention.

Referring to the drawings more in detail, Fig. 1 shows a casting 10 cast in a mold 11 around a refractory core 12 having metal tips 14 and 15. The metal tips 14 and 15 are formed with projections 16 which seat in recesses 17 in the mold to hold the core in place during the pouring operation. The metal tips 14 and 15 fuse into the poured metal or become integral with the metal of the casting during the subsequent rolling operation to form in the casting a closed core chamber 18.

Figure 3:
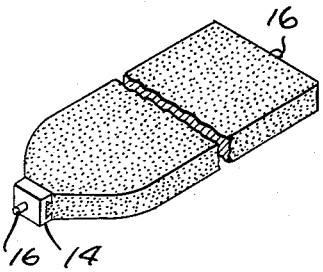
Fig. 3 is a detail view of a similar core having a metal tip at one end only.

A core of the above type is shown in Fig. 2. Fig. 3 shows a similar core with the metal tip at one end only. If this core is used instead of the core of Fig. 2 the casting will have a core chamber 18 which is closed at one end and open at the other.

Fig. 4 shows a refractory core 12 similar to Fig. 2 having a central metal support 19. If the core of Fig. 4 is used the core chamber 18 will be divided axially into two separate parts and will have closed ends. If the metal tips 14 and 15 are not used, open end core chambers will be produced. The type, size and shape of the core is selected to produce a vessel of the desired configuration.

Figure 5:
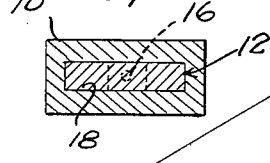
Fig. 5 is a transverse section through the casting of Fig. 1.
Figure 6:
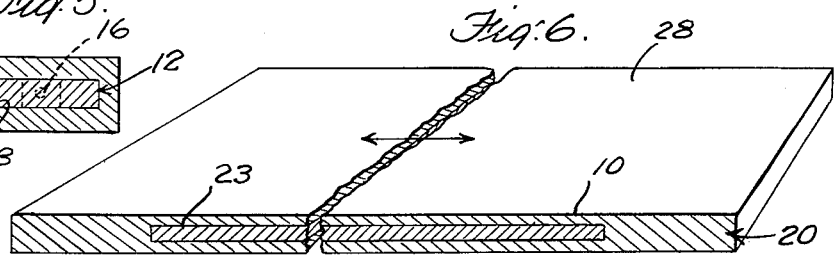
Fig. 6 is a broken perspective view of the casting after rolling in one direction.

The casting 10 after removal from the mold and with the core still in place as shown in Fig. 5 is rolled transversely by known technique to form the sheet 20 of Fig. 6 with walls 21 and 22 separated by a slit 23 in the area of the now flattened core chamber.

Figure 7:
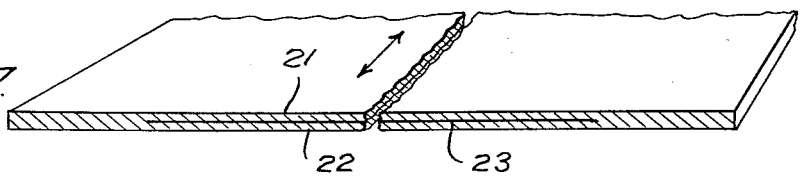
Fig. 7 is a similar broken perspective view of the casting after rolling in two directions to form a flat sheet.

The sheet 20 is then rolled longitudinally to extend it to the size required for the vessel or vessels to be formed, as shown in Fig. 7. Of course the order of the longitudinal and transverse rolling may be reversed or alternated as desired to shape the final sheet to the required form. The transverse rolling may be omitted if not required.

During the rolling the core 12 is crushed to powder form and forms an anti-weld material to prevent the walls 21 and 22 from welding together.

The sheet of Fig. 7 is now opened up to form the vessel of Figs. 8 to 10. For this purpose a hole is drilled into the flattened chamber or slit 23 between the walls 21 and 22 and fluid pressure is introduced to force the plies apart and form them into the desired contour, for example into the contour of a closed vessel having side walls which may be substantially cylindrical at at least their central portions, as shown in section in Fig. 10, and which taper or are flattened towards the ends, as shown in section in Fig. 9.

If one end of the slit 23 is open, as would be produced by the use of the core of Fig. 3, the walls may be expanded by fluid pressure or a tool may be introduced between the walls for expanding them into the form of an open end vessel, or a combination of hydraulic and mechanical means may be used.

The areas of the sheet beyond the flattened slit 23 produce longitudinal fins 24 which extend along the side walls of the vessel and form end fins 25 which may be removed or partially removed before inflation to leave beads 26 which extend across the closed end or ends of the vessel. Removal of the end fins 25 is desirable in order to limit the restraining effect which these fins would have upon the shaping of the walls of the vessel during inflation. The fins or ribs may serve as structural reinforcing members and also provide means for attaching supports or auxiliary equipment without the necessity for welding onto the walls of the vessel.

A plurality of vessels may be made from a single casting by making a row of parallel core chambers 30 in the casting as shown in Fig. 11. When rolled as above described and expanded a row of parallel vessels joined by intermediate webs are provided. The webs may be severed for separating the individual vessels if desired.

A longitudinally divided vessel may be made by forming a pair of vertically aligned core chambers 31 in the casting as illustrated in Fig. 12. When this structure is rolled and expanded a closed vessel is formed having a longitudinal dividing wall 32 separating the interior into two chambers 33 as shown in Fig. 13.

In the form shown the wall 32 is wavy or fluted due to the shortening of the span of the wall which occurs when the outer walls are expanded. Of course the wall 32 may be formed in a predetermined shape or may be made straight if the outer walls are stretched during the expanding operation.

When the core of Fig. 4 is used in making the casting a pair of axially aligned vessels is produced joined by webs 34 as in Fig. 14. The joining web 34 may be partially removed or notched to reduce the restraining influence thereof as in the case of the end fins 25 of Fig. 8. Of course more than two such axially aligned vessels may be made by introducing a plurality of intermediate metal members into the core.

These vessels may be severed through their joining webs 34 to form individual closed end vessels. Of course the closed end vessels may be severed transversely at any intermediate point to form a pair of vessels open at one end.

In any of the embodiments it is to be noted that the finally formed vessel is entirely integral and has the metallurgical characteristics produced by the rolling operations without local areas of differing characteristics such as would be produced by welding.

In the form shown in Fig. 8 the diameter of the vessel is shown as decreasing from the oval end section of Fig. 9 to the cylindrical central portion of Fig. 10. It is understood of course that this shape may be varied as desired by suitably shaping the core and that various intricate or irregular shapes of vessels may also be produced by correspondingly varying the contour of the core. The size and location of the openings may also be varied by suitable variations in the position and shape of the core. Such openings may be at the end or at the side, or a plurality of such openings may be formed in a single vessel as desired. The vessel may of course be made in various sizes, from those suitable for small pressure bottles to the dimensions of large boilers, autoclaves, or reactors.

What is claimed is:

1. The method of manufacturing an integral metal vessel which comprises forming a metal casting having a core chamber containing a core of anti-weld refractory material having a metal tip on at least one end, said tip being made of a metal adapted to be fused to the metal of the casting to close the core chamber at at least one end, rolling said casting to form a flat sheet having a pair of walls separated by a slit in the area corresponding to the core, said walls being maintained by the anti-weld material of the core against welding together during rolling, and separating the walls by applying pressure internally thereagainst to cause said walls to assume the configuration of a vessel having side walls and at least one end wall.

2. The method of manufacturing an integral metal vessel which comprises forming a metal casting having a core chamber containing a core of anti-weld refractory material, said chamber being closed at at least one end, rolling said casting to form a flat sheet having a pair of walls separated by a slit in the area corresponding to the core, said walls being maintained by the anti-weld material of the core against welding together during rolling, said sheet having fin forming areas extending along opposite sides of and around the end of said slit, trimming said fin forming area around the end of said slit to leave a narrow bead forming area and separating the walls by applying pressure internally thereagainst to cause said walls to assume the configuration of a vessel having side walls and at least one end wall with fins extending along opposite side walls and a bead extending around said end wall.

3. The method of making an integral metal vessel having side walls and at least one end wall, which comprises making a metal casting in a mold about a core of anti-weld material carrying a spacing member of a metal adapted to fuse into the metal of the casting and holding the core spaced from the mold whereby the casting contains a core chamber conforming to said core and closed at at least one end, rolling the casting to form a flat sheet having a pair of walls separated by a slit in the area corresponding to the core chamber and integrally joined in fin-forming areas around said slit, said walls being prevented from welding together during the rolling operation by the anti-weld material of the core in said slit, and separating and shaping said walls to form a vessel having side walls and at least one integral end wall.

4. The method set forth in claim 3 in which the core is formed in at least two parts separated by a spacing member composed of said metal whereby the casting contains at least two separate core chambers, and the rolled strip contains at least two slit areas separated by a fin-forming area, with the additional step of severing said strip through said fin-forming area for forming at least two separate vessels.

5. The method set forth in claim 4 in which said core parts are disposed in axial alignment to form axially spaced chambers.

6. The method of manufacturing an integral metal vessel which comprises forming a metal casting having a core chamber containing a core of anti-weld material, said chamber being closed at at least one end, rolling said casting to form a flat sheet having a pair of walls separated by a slit in the area corresponding to the core chamber, said walls being maintained by the anti-weld material of the core against welding together during rolling, said sheet having fin-forming areas extending along opposite sides of and around the end of said slit, trimming said fin forming areas around the end of said slit to leave a narrow bead forming area and separating the walls by applying pressure internally thereagainst to cause said walls to assume the configuration of a vessel having side walls and at least one end wall.

References Cited in the file of this patent

UNITED STATES PATENTS

| | | |
|---|---|---|
| Re. 19,058 | Armstrong | Jan. 23, 1934 |
| 29,276 | Holmes | July 24, 1860 |
| 1,723,659 | Rosenquist | Aug. 6, 1929 |
| 2,106,496 | Debor | Jan. 25, 1938 |
| 2,190,494 | Templin | Feb. 13, 1940 |
| 2,360,391 | Birchall | Oct. 17, 1944 |
| 2,372,800 | Stearns | Apr. 3, 1945 |
| 2,498,275 | Johnson | Feb. 21, 1950 |
| 2,503,191 | Branson | Apr. 4, 1950 |
| 2,690,002 | Grenell | Sept. 28, 1954 |

FOREIGN PATENTS

| | | |
|---|---|---|
| 401,476 | Germany | Sept. 8, 1934 |
| 205,695 | Australia | Jan. 10, 1957 |